United States Patent [19]
Gaudin

[11] Patent Number: 5,144,974
[45] Date of Patent: Sep. 8, 1992

[54] PURGE VALVE ASSEMBLY

[76] Inventor: Jeffrey Gaudin, 9749 S.W. 1st St., Plantation, Fla. 33324

[21] Appl. No.: 686,017

[22] Filed: Apr. 12, 1991

[51] Int. Cl.$^5$ .............................................. F16T 1/12
[52] U.S. Cl. ...................................................... 137/204
[58] Field of Search .......................................... 137/204

[56]  References Cited
U.S. PATENT DOCUMENTS

| 2,007,358 | 7/1935 | Anger | 137/204 |
| 2,687,841 | 8/1954 | Churchman | 137/204 X |
| 3,014,687 | 12/1961 | Keisling | 137/204 |

*Primary Examiner*—Alan Cohan
*Attorney, Agent, or Firm*—Malin, Haley, McHale, DiMaggio & Crosby

[57] ABSTRACT

An apparatus having an automatic purge valve assembly for draining condensate out of a compressed air storage tank. An air pressure switch, upon the presence of a predetermined atmospheric pressure in the air storage tank, will energize a relay which in turn enables a solenoid to open a purge valve, thus allowing any condensate present in the tank to be automatically drained through and out of an air outlet conduit to which the purge valve is attached. The relay shuts off automatically after only a brief period in order to quickly close the purge valve and thus avoid having a substantial amount of compressed air escape along with the condensate.

7 Claims, 2 Drawing Sheets

PURGE VALVE ASSEMBLY

BACKGROUND OF THE INVENTION

1. Field of the Invention

The present invention relates generally to condensation drainage and, more particularly, is concerned with an apparatus for automatically draining condensation from an air storage tank.

2. Description of the Prior Art

In the normal use of air compressors, and similar equipment, condensation build up occurs within the compressed air storage tank as a by-product of elevated atmospheric pressure. If the condensation is not removed from the air storage tank, it will eventually build up to a level sufficient to enter and be ejected from the pneumatic tool or other air driven device connected to the operator's end of the air hose. In the use of a compressed air paint sprayer, if condensate is ejected from the user's air hose, it will permit condensate to mix with the paint, causing water to be sprayed onto the surface being painted. This will usually ruin the paint job. Also, the invasion of excessive amounts of condensate and/or water vapor into the pneumatic equipment being used usually leads to temporary or permanent damage to the equipment.

In an attempt to solve this problem, it is commonplace to attach a manual purge valve to the bottom portion of the air storage tank for manually draining the accumulated condensation. Periodically the operator will have to stop what he is doing in order to manually open the valve and allow the condensate to drain or be purged out. Although this manual valve has proven to be an effective way to solve the problem of condensation build up, operators of pneumatic equipment frequently simply forget to drain the condensation by the aforementioned manual purging operation.

Consequently, a need exists for an apparatus to automatically drain condensate from a compressed air storage tank which will not depend on the operator of such equipment to remember to periodically actuate a purge means.

SUMMARY OF THE INVENTION

It is an object of the invention to provide an apparatus which will automatically drain the condensate from an air storage tank.

It is another object of the invention to provide an apparatus for purging condensate from an air storage tank while not requiring an operator of air driven equipment to stop using the equipment while said purging occurs.

It is yet another object of the invention to provide an apparatus for automatically draining condensate from an air storage tank while allowing only a nominal amount of compressed air to escape while such draining occurs.

It is still another object of the invention to provide an apparatus for automatically draining condensation from a compressed air storage tank which operates as a function of the pressure within the tank.

These and other objects, apparent from the detailed description of the invention which follows, are accomplished by an apparatus having an automatic purge valve assembly for draining condensate out of a compressed air storage tank. An air pressure switch, upon the presence of a predetermined atmospheric pressure in the air storage tank, energizes a relay which in turn enables a solenoid to briefly open a purge valve, thus allowing any condensate present in the tank to be automatically drained through an air outlet conduit to which the purge valve is attached. The relay shuts off automatically after only a brief period in order to quickly close the purge valve and thus avoid having a substantial amount of compressed air escape along with the condensate.

Other objects and advantages of the invention will become apparent from the consideration of the following detailed description taken in connection with the accompanying drawings wherein certain methods and installations for practicing the invention are illustrated. However, it is to be understood that the invention is not limited to the details disclosed but includes all such variations and modifications as fall within the spirit of the invention and the scope of the appended claims.

DETAILED DESCRIPTION OF THE DRAWINGS

Figure 1:
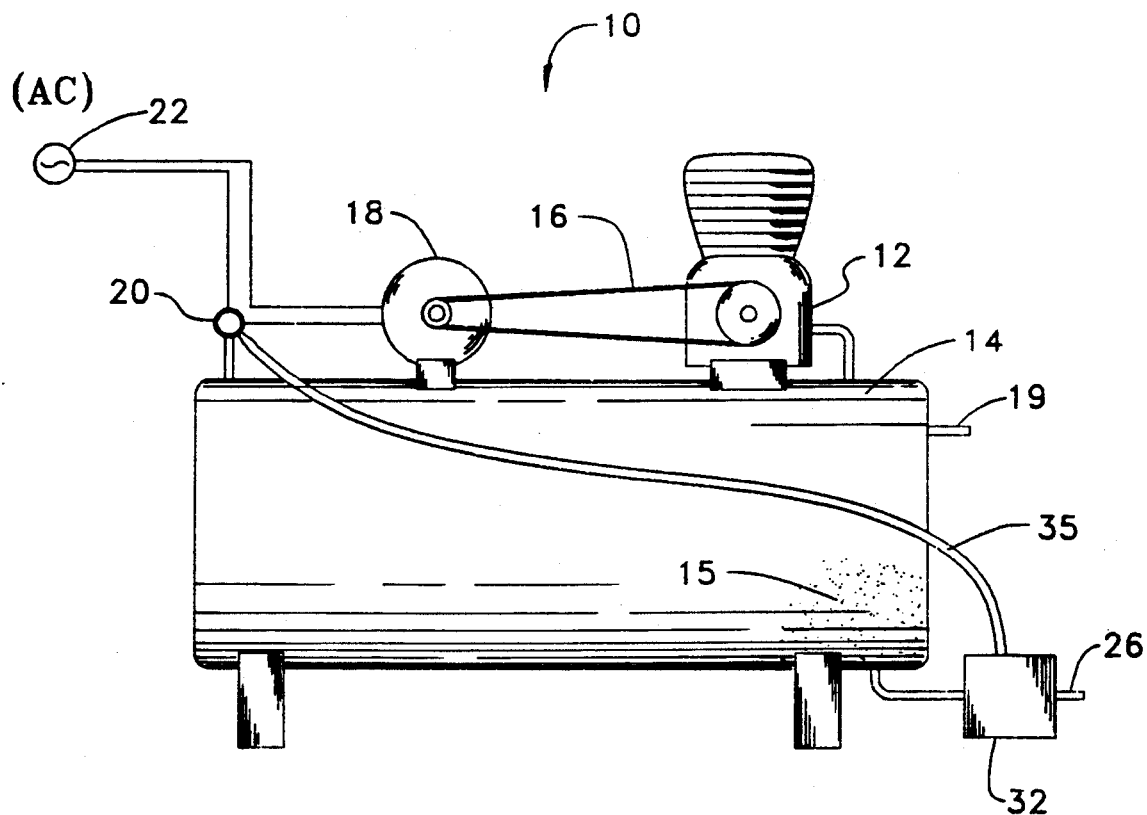
FIG. 1 is an elevational view of an air compressor apparatus which includes the present invention.

Referring now to the drawings, and more particularly to FIG. 1, there is shown an air compressor apparatus, generally designated by the reference numeral 10. Apparatus 10 includes air compressor 12, air storage tank 14, drive means 16, motor 18, air pressure switch 20 and an electrical power means such as AC power source 22. In operation, AC-source 22 supplies power to the motor 18 which, in cooperation with drive means 16 and air compressor 12, produces compressed air. The compressed air produced is pumped into and stored in air storage tank 14. Typically, AC-source 22 does not supply power to motor 18 on a continuous basis. Rather, when the pressure in air storage tank 14 drops below a predetermined value, switch 20 will sense the condition and energize, motor 18 in order to produce more compressed air, which in turn raises the ambient pressure in air storage tank 14.

In normal operation of an air compressor system such as apparatus 10, condensation 15 will accumulate in the air storage tank, which, if not drained, will eventually travel through the compressed air outlet 19 into the air lines, hoses and tools (not shown) normally connected to outlet 19 and used in conjunction with apparatus 10.

In order to provide a means for automatically purging this unwanted condensate from tank 14, I have invented an automatic purge valve assembly designated generally as 32.

Figure 2:
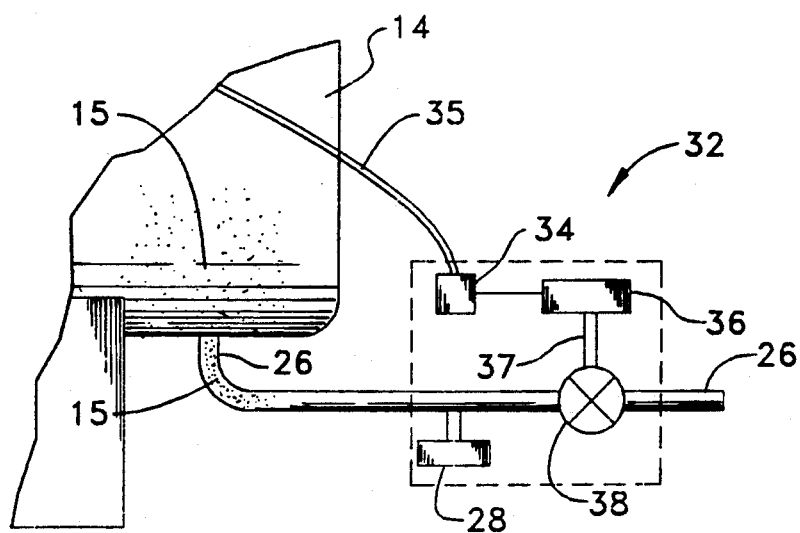
FIG. 2 is an enlarged elevational view of the portion of the apparatus shown in FIG. 1 pertaining to the present invention.

As shown in FIGS. 1 and 2, when the air pressure in air storage tank 14 has reached a predetermined value, normally open air pressure actuated switch 20 will be close, energizing thermal time delay relay 34 by supplying power to it from AC source 22. Once energized via electrical interconnection with switch 20 via means 35, relay 34 energizes the coil (not shown) inside solenoid 36, which in turn moves an armature in well known fashion into contact with purge valve 38 to open said valve 38 and thereby allow the escape of condensate, along with a nominal amount of compressed air, from within air storage tank 14. Relay 34, being of the thermal time delay type, reopens after reaching a preset temperature and thus de-energizing solenoid 36 and closing valve 38. In the preferred embodiment, but not by way of limitation, relay 34 should be calibrated to reach said preset temperature within 2-6 seconds so as not to allow an undue quantity of compressed air to escape from tank 14.

Purge valve 38 is normally closed and is preferably located in outlet or purge conduit 26. When relay 34 is not energized, purge valve 38 is closed and thus blocks the escape of compressed air through conduit 26. Purge conduit 26 is connected at one end to an aperture in the bottom of air storage tank 14.

Additionally, relay 34 should be of such a character wherein after it disables itself, it remains disabled during cool down for at least 60 seconds. However, a shorter or longer period of disablement may be elected depending upon the needs of a particular system.

It should be noted that purge valve assembly 32 is powered, in the preferred embodiment, by power source 22 in order to minimize the number of electric power sources required. If necessary, however, any other suitable source of power may be substituted.

Figure 3:
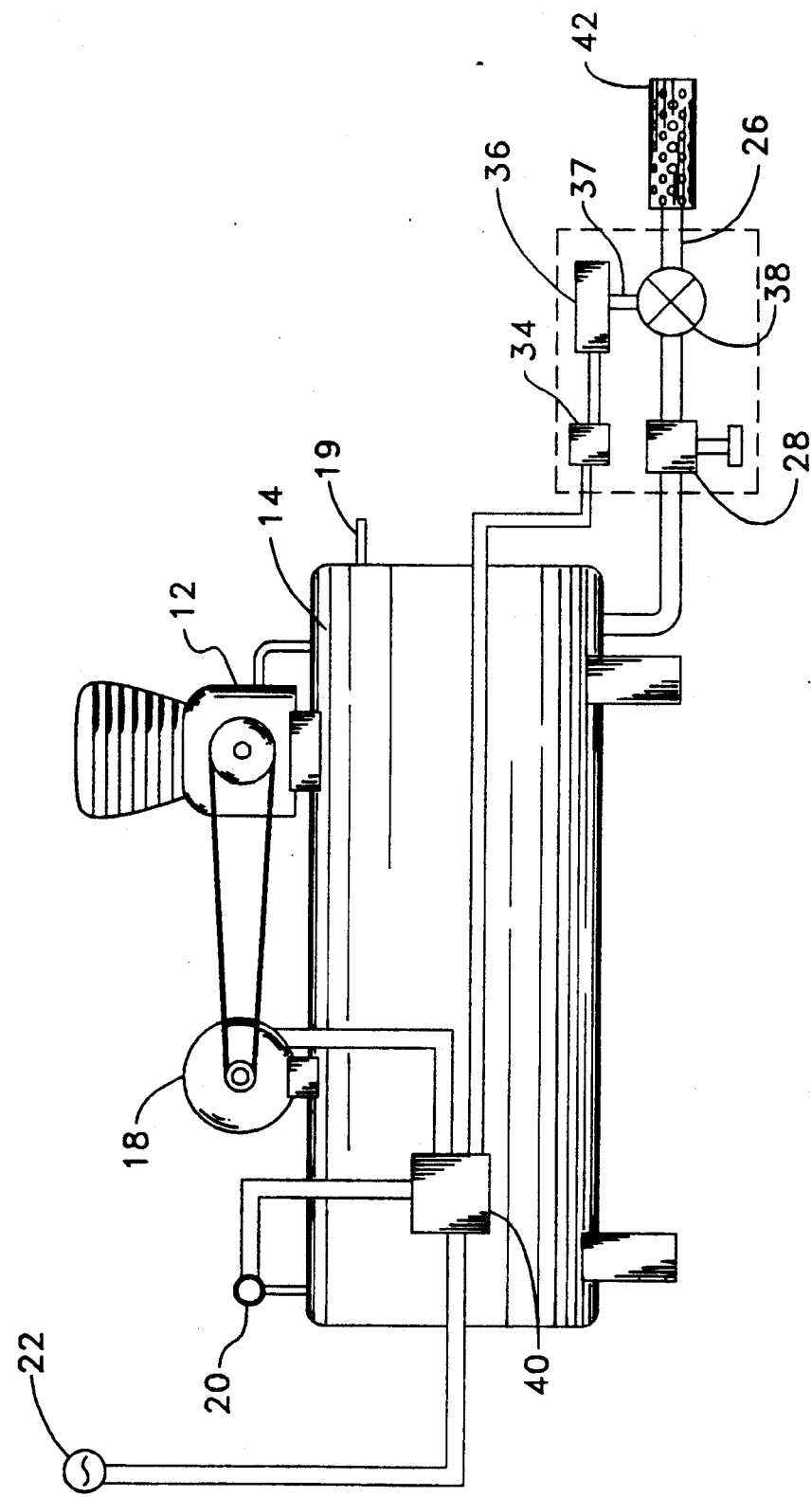
FIG. 3 is a elevational view of an alternative embodiment of the air compressor of the invention.

FIG. 3 shows an alternative wiring arrangement for powering both motor 18 and purge apparatus 32. In this alternative embodiment, a junction box 40 is used to connect motor 18 and relay 34 in parallel. Therefore, when the predetermined pressure is reached within storage tank 14, switch 20 closes, energizing motor 18 and relay 34. Relay 34 reopens as set forth above. Upon a predetermined maximum pressure being reached in storage tank 14, switch 20 opens, thereby de-energizing motor 18 and relay 34. Thereafter, relay 34 may be re-energized and hence energize solenoid 36 after relay 34 has had sufficient time to cool.

It should be noted that sound damping means 42 such as a muffler, may be employed to reduce the noise level accompanying the release of condensate and pressurized air from purge conduit 26 during the purging operation.

In case of malfunction of automatic purge valve assembly 32 or some other problem, air outlet conduit 26 has located between purge valve means 38 and air storage tank 14 a manual override means 28 such as petcock 28 for draining condensation 15. Manual override means 28 may be any manual valve known in the industry and operates independently of automatic drain valve assembly 32.

It is thought that the automatic drain valve assembly of the present invention and many of its attendant advantages will be understood from the foregoing description, and it will be apparent that various changes may be made in the form, construction and arrangement of the parts thereof without departing from the spirit and scope of the invention or sacrificing all of its material advantages, the form herein before described being merely a preferred or exemplary embodiment thereof.

I claim:

1. An automatic drain valve assembly for draining accumulated moisture from an air compressor, or similar device, having an air storage tank, comprising:
   outlet conduit means extending outwardly from an aperture defined by said air storage tank:
   a purge valve means located on said conduit means to fluidly communicate, when open, the interior of said tank with the ambient;
   activating means, connected to said storage tank and said purge valve, for automatically activating said purge valve upon the presence of a predetermined pressure in said storage tank, wherein said activating means includes a thermal time relay, solenoid means and an air pressure switch means.

2. The automatic purge valve assembly of claim 1, wherein when said relay means is energized, said relay heats up to a predetermined temperature, and once at said predetermined temperature, said relay means automatically de-energizes and remains de-energized for a predetermined period of time before being reset.

3. The automatic purge valve assembly of claim 2, wherein said predetermined period of time is approximately 60 seconds.

4. The automatic purge valve assembly of claim 1, further comprising a manual override means for manually purging said accumulated water from said tank, located on said outlet conduit means intermediate said storage tank and said purge valve outlet and adapted to, when open, fluidly communicate the interior of said tank with the ambient.

5. An automatic drain valve assembly for draining accumulated moisture from an air compressor, or similar device, having an air storage tank, comprising:
   outlet conduit means extending outwardly from an aperture defined by said air storage tank;
   a purge valve means located on said conduit means to fluidly communicate, when open, the interior of said tank with the ambient;
   activating means, connected to said storage tank and said purge valve, for automatically activating said purge valve upon the presence of a predetermined pressure in said storage tank, wherein said activating means includes a relay means, a solenoid means and air pressure switch means, said relay means being electrically connected to said solenoid means, said relay means being a thermal time relay, said solenoid means being connected to said purge valve means for selective opening and closing of said purge valve means to drain said accumulated moisture from said air storage tank upon activation and deactivation, respectively, of said activating means.

6. The automatic purge valve assembly of claim 5, wherein when said relay means is energized, said relay heats up to a predetermined temperature, and once at said predetermined temperature, said relay means automatically de-energizes and remains de-energized for a predetermined period of time before being reset.

7. The automatic purge valve assembly of claim 5, further comprising a manual override means for manually purging said accumulated moisture from said tank, located on said outlet conduit means intermediate said storage tank and said purge valve outlet and adapted to, when open, fluidly communicate the interior of said tank with the ambient.

* * * * *